Sept. 1, 1953 A. M. YOUNG 2,650,667
PIVOTALLY MOUNTED ROTATING WING FOR AIRCRAFT
Original Filed April 5, 1946
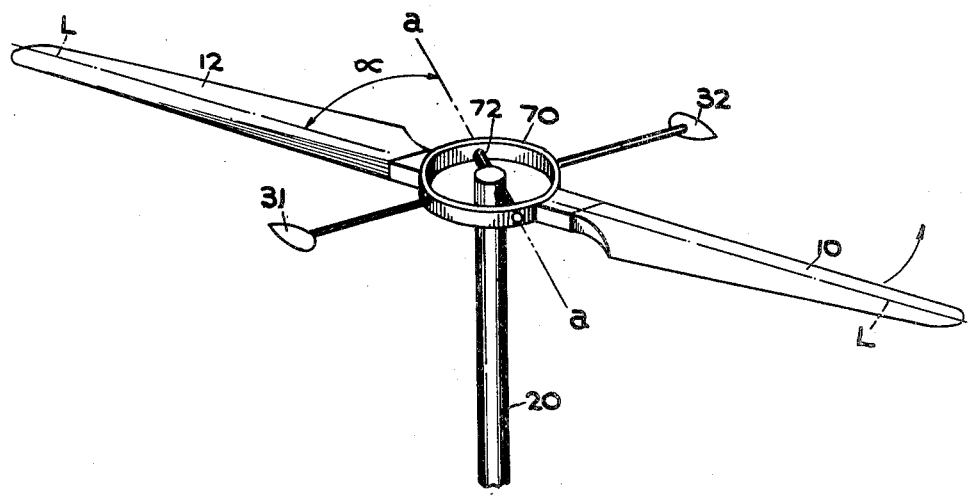
INVENTOR
*Arthur M. Young*
BY
*Bean, Brooks, Buckley & Bean*
ATTORNEYS Patented Sept. 1, 1953

2,650,667

UNITED STATES PATENT OFFICE 2,650,667

PIVOTALLY MOUNTED ROTATING WING FOR AIRCRAFT

Arthur M. Young, Buffalo, N. Y., assignor to Bell Aircraft Corporation, Buffalo, N. Y.

Original application April 5, 1946, Serial No. 659,905, now Patent No. 2,510,006, dated May 30, 1950. Divided and this application May 1, 1950, Serial No. 163,979

4 Claims. (Cl. 170—160.57)

This invention relates to rotary wing aircraft, and more specifically to rotor control means for helicopter aircraft and the like; and this application is a division of my copending application Serial No. 659,905, now Patent No. 2,510,006, issued May 30, 1950.

One of the objects of the invention is to provide an improved rotor mounting and control arrangement whereby the degree of flapping of the rotor is limited while avoiding undue stressing of the rotor mast and blade structures.

Another object of the invention is to provide a helicopter aircraft wherein the rotor is self-stabilizing relative to the aircraft.

Another object of the invention is to provide a rotor which will not incur inclination of the blade tip path plane due to transverse airflow.

Another object of the invention is to achieve the objects set forth hereinabove by means of a rotor control mechanism wherein the lift forces tending to displace the rotor are employed to effect counter-control thereof, as distinguished from a mechanism which initially permits actual displacements of the blade tip path plane and then translates such displacements into control effects countering the tendency of the rotor to further incline (such as in my earlier Patent No. 2,256,635).

Other objects and advantages of the invention will appear from the specification hereinafter.

In the drawing:

The figure is a diagrammatic illustration in perspective of a dual blade rotor mounting and flapping control means of the invention.

The present invention contemplates a rotor of either the single blade or diametrically opposed dual blade type mounted upon an aircraft body by means of a connection device permitting universal inclination of the rotor. In either case the rotor and the hub mounting unit constitutes a dynamic system having mass along the blade longitudinal axis and along the blade short axis or chord axis.

The figure illustrates an application of the invention to a dual bladed rotor which includes a hub 70 pivoted upon the upper end of the drive shaft or mast 20 by means of a cross pin 72. The pin 72 extends along an axis $a$—$a$ which is at an angle $a$ to the spanwise axis of the rotor blade structure. Weight masses 31—32 are arranged to be carried upon corresponding struts 33—34 extending in diametrically opposed relation from the hub piece 70 in a direction transverse to the longitudinal axis of the rotor blade structure. Thus, the chordwise inertia of the rotor blade system is increased, and the stability of the rotor system in its plane of rotation will be thereby correspondingly increased. It is to be understood that in the case of any application of the invention the chordwise mass of the blade structure may be supplemented if desired by any suitable means as explained hereinabove or for example by employing a more massive hub arrangement, or by any other suitable method which may be preferred. The operation of the mechanism of the figure may be illustrated for example by assuming the mast 20 to tip upwardly toward the position of blade 10 as shown in the figure. The trailing weight mass 31 will thereupon be pushed up and will reach the top of its rise at a position 90° later in its orbit of rotation, thereby increasing the angle of attack of the blade 12 in such manner that when the blade 12 reaches the position of blade 10 as shown in the figure the blade 12 will have an elevation above the elevation of the blade 10 as shown in the figure; and the rotor will therefore follow the inclination of the mast which initiated the control effects described.

It is to be understood that to permit the control mechanism of the invention to function properly a certain speed of rotor rotation must be maintained, depending upon the chordwise mass of the blade structure and the angle of the axis $a$—$a$ relative to the long axis L—L of the blade structure. In fact, when the rotor is moving at less than the necessary speed or is stationary, the linkage controlling the blade mechanism tends to destabilize the blade. For example, referring again to the figure and assuming that the rotor is stationary, in the event a transverse wind impinges against blade 10 and causes it to lift and pivot around the axis $a$—$a$, the resulting increase in angle of attack of blade 10 will induce a more violent lifting of the blade and the rotor will tend to flop over until blocked by interferences of the blade structure with fixed portions of the aircraft. However, whenever the rotor is stationary the danger of over-stressing the mast and/or rotor structure in this manner is minimized.

Thus, it will be appreciated that the invention provides protection for the rotor mast and blade structure against excessive shocks and/or bending loads such as normally result from excessive flapping of the blade structure under rotor operative conditions, and also provides the rotor to be self-stabilizing relative to the aircraft and avoids inclination of the rotor blade tip path plane due to transverse airflow.

It will also be understood that whereas only one form of the invention is illustrated and described in detail hereinabove the invention is not so limited but that various changes may be made therein without departing from the spirit of the invention or the scope of the appended claims.

I claim:

1. A rotor comprising a drive shaft, a mounting member, pivot means connecting said mounting member to said drive shaft and defining a pivot axis, and blade means carried by said mounting member for movement about said pivot axis, said pivot axis intersecting the drive shaft axis and extending behind said blade means in view of the direction of rotor rotation at an acute angle with respect to the spanwise axis of said blade means.

2. In an aircraft, a drive shaft, a hub member, pivot means connecting said hub member to said drive shaft and defining a pivot axis, and a dual blade rotor fixedly mounted on said hub member for movement therewith about said pivot axis, said pivot axis intersecting the drive shaft axis and extending in a plane normal thereto behind the blades of said rotor in view of the direction of rotor rotation at acute angles with respect to the rotor span axis.

3. A rotor comprising a drive shaft, pivot means connected to said drive shaft and providing a pivot axis intersecting the drive shaft axis and lying in a plane normal thereto, and a blade mounted on said pivot means for movement about said pivot axis, said pivot axis extending behind said blade in view of the direction of rotor rotation at an acute angle with respect to the spanwise axis of said blade.

4. In an aircraft, a drive shaft, pivot means connected to said drive shaft having a pivot axis intersecting the drive shaft axis, and a dual blade rotor mounted on said pivot means for movement about said pivot axis, said pivot axis extending behind the blades of said rotor in view of the direction of rotor rotation at acute angles with respect to the rotor span axis.

ARTHUR M. YOUNG.

References Cited in the file of this patent

UNITED STATES PATENTS

| Number | Name | Date |
|---|---|---|
| 2,023,684 | Hubbell | Dec. 10, 1935 |
| 2,110,638 | Synnestvedt | Mar. 8, 1938 |